United States Patent
Farquharson et al.

(12)

(10) Patent No.: US 6,293,973 B1
(45) Date of Patent: Sep. 25, 2001

(54) METHOD OF CONTROLLING OXALATE PRECIPITATION IN BAYER PROCESS LIQUOR

(75) Inventors: Graeme J. Farquharson, Sydney; John D. Kildea, Mandurah W. A., both of (AU)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/120,643

(22) Filed: Jul. 22, 1998

Related U.S. Application Data

(63) Continuation-in-part of application No. 08/729,106, filed on Oct. 11, 1996, now abandoned.

(51) Int. Cl.⁷ ................................ B01D 9/00; C01F 7/00
(52) U.S. Cl. ...................... 23/300; 23/305 A; 423/130; 423/122
(58) Field of Search ..................... 423/122, 121, 423/130, 131; 23/296, 295 R, 305 A, 300

(56) References Cited

U.S. PATENT DOCUMENTS

| | | |
|---|---|---|
| 4,275,042 | 6/1981 | Lever . |
| 4,737,352 | 4/1988 | Owen et al. . |
| 5,106,599 | 4/1992 | Roe . |
| 5,284,634 | 2/1994 | Strominger et al. . |
| 5,385,586 | 1/1995 | Farquharson et al. . |
| 5,547,647 | 8/1996 | Moody et al. . |
| 5,837,215 | * 11/1998 | Tippett et al. ................... 423/600 |

OTHER PUBLICATIONS

Light Metals, pp. 95–101 (1995), "Development of an Effective Liquor Oxalate Stabilizer," Farquharson, et al.

* cited by examiner

*Primary Examiner*—Steven P. Griffin
*Assistant Examiner*—Eileen E. Nave
(74) *Attorney, Agent, or Firm*—Kelly L. Cummings; Thomas M. Breininger

(57) ABSTRACT

A method is disclosed for controlling the precipitation of soluble sodium oxalate in Bayer process liquor which comprises adding a surface active quaternary ammonium compound to the Bayer process liquor and then subsequently adding a mixture of a hydrophobic oil and at least one surfactant.

13 Claims, No Drawings

METHOD OF CONTROLLING OXALATE PRECIPITATION IN BAYER PROCESS LIQUOR

This application is a continuation-in-part of U.S. Ser. No. 08/729,106, filed Oct. 11, 1996, now abandoned.

FIELD OF THE INVENTION

This invention relates generally to a method of treating alumina trihydrate in the Bayer process and, more particularly, to a method of controlling the precipitation of soluble sodium oxalate in Bayer process liquor.

BACKGROUND OF THE INVENTION

In the Bayer process, bauxite ore is digested in a caustic slurry to solubilize the alumina values in the ore. The insoluble material (red mud) is then removed by sedimentation in thickeners, which results in an alumina rich liquor which is then seeded to produce the desired alumina trihydrate. Recovered alumina trihydrate can be calcined to an alumina suitable for smelting.

To obtain the maximum recovery of aluminum values from Bayer process liquor, a plant will typically attempt to maximize the liquor caustic level and minimize the final precipitator temperature. However, it is known in the art that a Bayer liquor contaminant, sodium oxalate, can co-precipitate with alumina trihydrate, and that the solubility of sodium oxalate in Bayer process liquor is generally decreased by increasing caustic levels and decreasing precipitation temperatures. Uncontrolled co-precipitation of sodium oxalate can cause a number of problems for a Bayer plant, which thereby places restrictions on plant operating parameters and therefore on alumina values recovery.

Well-known adverse effects of co-precipitation of sodium oxalate include increasing product fines and soda levels, and interference with the efficient size classification of alumina trihydrate. High quality smelting grade calcined alumina usually has a crystal coarseness specification of 90–95% of the crystals being at least 44 microns in diameter. It is known in the art that co-precipitating sodium oxalate can cause the alumina trihydrate crystals to precipitate as a very fine material, which is below the usual quality specification for smelting grade calcined alumina of 90–95% of the crystals being 44 microns or greater in diameter.

Alumina trihydrate is precipitated from Bayer process liquor, which in essence is a concentrated sodium hydroxide solution. Typical soda levels in smelter grade calcined alumina are only 0.2–0.6% by weight as $Na_2O$. Nonetheless, it is desirable to produce alumina with soda levels at the lower end of this range. Modern smelters generally calculate their break-even point for soda in alumina at 0.35% $Na_2O$.

Input of sodium oxalate into the Bayer process is known in the art to be mainly associated with the digestion of fresh bauxite. Oxalate may be present either as an impurity in the bauxite, or is produced from the caustic degradation of other organic impurities present in the bauxite. To maintain an appropriate steady state sodium oxalate concentration, alumina trihydrate refineries must balance the fresh input of sodium oxalate with a means for its removal from the process. Two methods are widely employed.

In the first oxalate removal method, hereinafter referred to as sidestream oxalate crystallization, sodium oxalate is prevented from co-precipitating with the alumina trihydrate by appropriate control of process conditions. After precipitation and recovery of the alumina trihydrate, the spent liquor is for example partially evaporated, then pumped to a vessel containing sodium oxalate seed causing additional sodium oxalate to precipitate from the spent liquor. Recovered sodium oxalate is used partly as seed for fresh spent liquor and the remainder is removed from the process and destroyed, for example by calcination.

In plants employing the second oxalate removal method, hereinafter referred to as seed washing, the sodium oxalate is allowed to co-precipitate with the alumina trihydrate. The sodium oxalate and finer crystals of alumina trihydrate are then jointly recovered through classification. The sodium oxalate is next removed from the fine alumina trihydrate, generally by hot water washing, and the purified alumina trihydrate is then returned to the process as seed. For Bayer plants using the seed washing method, particularly for those refineries producing a sandy (coarse) alumina, the precipitation of alumina trihydrate can typically be arranged into at least two sequential sections, agglomeration followed by growth. The process conditions are carefully controlled such that co-precipitation of sodium oxalate usually occurs only in the growth section.

A method for inhibiting the precipitation of sodium oxalate in the Bayer process has been recently described in U.S. Pat. No. 5,385,586, wherein certain quaternary amines are added to the liquor prior to or during the alumina trihydrate precipitation step. This method is effective and practical for plants employing the sidestream oxalate crystallization method of oxalate removal because the oxalate stabilizing effect of the additive can be eliminated prior to oxalate crystallization by the heating required for partial liquor evaporation, as shown by Farquharson et. al., Light Metals, 95–101 (1995). By contrast, for plants employing the seed washing method of oxalate removal, no such heating step prior to oxalate co-precipitation is available, and application of quaternary amine liquor oxalate stabilizers to these plants will in principle only lead to an undesirable increase in spent liquor oxalate levels.

Therefore, the control of oxalate co-precipitation in plants employing the seed washing method of oxalate removal is highly desirable. It is also highly desirable to prevent oxalate co-precipitation in agglomeration tanks. Furthermore, it is highly desirable to eliminate oxalate co-precipitation in certain sections of the precipitation circuit because it often leads to production limiting problems in the classification of alumina trihydrate due to the inconsistent formation of poorly settling oxalate-alumina trihydrate morphologies.

SUMMARY OF THE INVENTION

A method is disclosed for controlling the precipitation of soluble sodium oxalate in Bayer process liquor which comprises adding a surface active quaternary ammonium compound to the Bayer process liquor and then subsequently adding a mixture of a hydrophobic oil and at least one surfactant. The quaternary ammonium compound maintains the oxalate in solution and, when it is desired at a particular point in the process to precipitate the oxalate from the liquor, the oil and surfactant mixture is added. This method effectively controls oxalate precipitation, and thereby achieves improved trihydrate particle size control and coarser particles.

DETAILED DESCRIPTION OF THE INVENTION

The present invention is directed to a method for controlling the precipitation of soluble sodium oxalate in Bayer process liquor which comprises adding a surface active quaternary ammonium compound to the Bayer process liquor or Bayer process slurry (collectively referred to herein as "Bayer process liquor" or "Bayer liquor") and then subsequently adding a mixture of a hydrophobic oil and at least one surfactant to the Bayer process liquor. This method is particularly suited for controlling oxalate co-precipitation in plants employing the seed washing method of oxalate removal.

The surface active quaternary ammonium compounds which may be used in the practice of the present invention are surface active cationic alkylammonium compounds having at least five carbon atoms. Preferably, the cationic alkylammonium compound is selected from the group consisting of methylbis(2-hydroxyethyl)cocoalkylammonium chloride, methyl(15 mol ethoxylate)cocoalkylammonium chloride, methylbis(2-hydroxyethyl)oleylammonium chloride, trimethylcocoalkylammonium chloride, trimethyltallowalkylammonium chloride, trimethylcetylammonium chloride, trimethyloleylammonium chloride and tris(2-hydroxyethyl)ammonium chloride.

The hydrophobic oils of the present invention may be chosen from the group which include the residue of alcohol distillations, paraffinic oils, higher paraffinic alcohols, aromatic oils, naphthenic oils and blends of any of these oils. Preferably, the hydrophobic oil is the residue of alcohol distillations.

The surfactants of the present invention may be chosen from either of the groups comprised of fatty acid based surfactants or the group of surfactants having a hydrophilic-lipophilic balance (HLB) of not more than about 12. Preferably, the surfactants comprise a mixture in a hydrophobic oil of at least one fatty acid based surfactant and/or at least one surfactant chosen from the group of surfactants having a HLB of not more than about 12. Preferably, the mixture of the hydropholic oil and at least one surfactant is comprised of up to about 99% by weight of the hydrophobic oil.

The fatty acid based surfactants which may be used include tall oil, oleic acid and esters of oleic acid. A suitable ester of oleic acid is polyethylene glycol dioleate.

The group of surfactants having a HLB of not more than about 12 which may be used include certain of the condensation products of ethylene oxide and/or propylene oxide with alcohols or amines.

The quaternary ammonium compound may be dosed to the Bayer process liquor in an effective amount of from about 1 to about 100 parts per million (ppm), and preferably from about 1 to about 25 ppm. The hydrophobic oil/surfactant mixture may be dosed to the Bayer process liquor in an effective amount of from about 1 to about 100 ppm, and preferably from about 2 to about 25 ppm.

The present inventors have discovered that the control of soluble sodium oxalate precipitation can be effectively achieved by adding a quaternary ammonium compound to stabilize the oxalate in solution and then later adding a hydrophobic oil/surfactant mixture to deactivate the stabilizer so that the oxalate is precipitated from the liquor and removed as a contaminant. The point in time in which the hydrophobic oil/surfactant mixture is added to the Bayer liquor is process-dependent. In other words, the addition of the mixture is based upon where (e.g., in which tank(s)) the plant operator wants to promote oxalate precipitation. For instance, in plants using a co-precipitation system, alumina trihydrate is typically precipitated in a series of tanks. The first of these tanks must remain free of oxalate because oxalate contamination will affect particle sizing. The later tanks, however, are used to precipitate both trihydrate and oxalate because the sizing of trihydrate is unaffected by oxalate after the initial phases of crystallization. Quaternary ammonium compounds can be used to inhibit oxalate crystallization in the first phase and hence control particle sizing. Beyond this however, it is important to ensure the removal of oxalate via crystallization in the later phase of the system. Without the addition of the hydrophobic oil/surfactant mixture, the oxalate would remain in solution.

A key advantage of this invention is that by using the quaternary ammonium compound and subsequently the hydrophobic oil/surfactant mixture in appropriate areas, plant operators can precisely control where the oxalate precipitates and where it does not precipitate (such as in the agglomeration tanks). Another important advantage is that process improvements, such as better trihydrate particle size control and coarser particles are achieved.

EXAMPLES

The following examples are intended to be illustrative of the present invention and to teach one of ordinary skill how to make and use the invention. These examples are not intended to limit the invention or its protection in any way.

Example 1

Nalco® 138 quaternary amine liquor oxalate stabilizer (15 ppm) was added to 210 gm of refinery A green liquor (oxalate content 3.1 g/l) in 250 ml Nalgene bottles containing from 0–100 ppm of either the residue from distillation of alcohols or oleyl alcohol. Refinery A seed (90 gm) was charged to each bottle, and the slurries were maintained at 55° C. while being agitated by end over end rotation. Liquor oxalates were determined at various times as shown in Table 1.

Table 1

| No. | 138 (ppm) | Formulation added | Formulation dose (ppm) | Liquor Oxalate (g/l) after: 5 hr | 24 hr | 72 hr |
|---|---|---|---|---|---|---|
| 1 | — | — | — | 2.8 | 2.4 | 2.1 |
| 2 | — | — | — | 2.7 | 2.4 | 2.1 |
| 3 | 15 | — | — | 3.2 | 3.3 | 3.1 |
| 4 | 15 | — | — | 3.2 | 3.3 | 3.2 |
| 5 | 15 | alcohol d.r.* | 100 | 2.9 | 2.7 | 2.5 |
| 6 | 15 | | 50 | 3.0 | 2.6 | 2.5 |
| 7 | 15 | | 25 | 3.1 | 2.7 | 2.5 |
| 8 | 15 | oleyl alcohol | 100 | 2.6 | 2.6 | 2.4 |
| 9 | 15 | oleyl alcohol | 50 | 2.7 | 2.6 | |
| 10 | 15 | oleyl alcohol | 25 | 2.7 | 2.6 | |

*alcohol d.r. is the residue from distillation of alcohols

The data in Table 1 show that in the undosed controls (Nos. 1 and 2), liquor oxalate had been reduced from 3.1 g/l in the green liquor to 2.8, 2.4 and 2.1 g/l after the slurries had been maintained at 55° C. for 5, 24 and 72 hr respectively. There was no significant precipitation of oxalate from slurries dosed only with Nalco® 138 (Nos. 3 and 4) under these conditions. Slurries co-dosed with Nalco® 138 and either the residue from distillation of alcohols (Nos. 5–7) or with oleyl alcohol (Nos. 8–10) all showed significant oxalate precipitation, showing that the oxalate stabilizing effect of the Nalco® 138 oxalate stabilizer had been substantially removed.

Example 2

Nalco® 138 quaternary amine liquor oxalate stabilizer (15 ppm) was added to 210 gm of refinery A green liquor (oxalate content 3.1 g/l) in 250 ml Nalgene bottles containing from 0–100 ppm of various blends of the residue from distillation of alcohols and tall oil fatty acid surfactant. Refinery A seed (90 gm) was charged to each bottle, and the slurries were maintained at 55° C. while being agitated by end over end rotation. Liquor oxalates were determined at various times as shown in Table 2.

TABLE 2

| No. | 138 (ppm) | Formulation added* | Formulation dose (ppm) | Liquor Oxalate (g/l) after: | | |
|---|---|---|---|---|---|---|
| | | | | 5 hr | 24 hr | 72 hr |
| 11 | — | — | — | 2.8 | 2.4 | 2.1 |
| 12 | — | — | — | 2.7 | 2.4 | 2.1 |
| 13 | 15 | — | — | 3.2 | 3.3 | 3.1 |
| 14 | 15 | — | — | 3.2 | 3.3 | 3.2 |
| 15 | 15 | alcohol d.r. | 25 | 3.1 | 2.7 | 2.5 |
| 16 | 15 | a | 25 | 2.9 | 2.6 | 2.5 |
| 17 | 15 | b | 25 | 2.7 | 2.6 | 2.5 |
| 18 | 15 | c | 25 | 2.6 | 2.5 | |

*alcohol d.r. is the residue from distillation of alcohols; formulations a–c are blends of 15,30 and 50% respectively of tall oil fatty acid surfactant in the residue from distillation of alcohols.

The data of Table 2 show that the various tall oil blends (Nos. 16–18) gave improved oxalate precipitation rates compared to the neat oil base (No. 15), particularly up to at least 5 hrs. of precipitation time.

Example 3

Nalco® 138 quaternary amine liquor oxalate stabilizer (25 ppm) was added to 200 ml slurries of refinery B green liquor and Alcoa C31 hydrate seed (40 gm; 200 g/l) in 250 ml Nalgene bottles. Two slurries were additionally dosed at 100 ppm with one of two surfactant blends:

Surfactant blend A: a blend of polyoxyalkylated glycerol (5%) and a 3 mol ethoxylated dodecanol (75%) in a paraffinic process oil.
Surfactant blend B: a blend of tall oil in the residue from the distillation of C10 alcohols.

The slurries were then maintained at 75° C. with end over end rotation in a water bath for 14 hr. After this time, two additional slurries dosed with only Nalco® 138 (25 ppm) were then also dosed (100 ppm) with one of either surfactant blend A or surfactant blend B. All of the slurries were then quickly cooled (<1 min) to 62° C., simulating refinery interstage coolers. The slurries were maintained at 62° C. for 6 hr, then at 60° C. for a further 43 hr. Liquor oxalates were determined at various stages as shown in Table 3.

TABLE 3

| Test No. | Experiment* | Precipitation Temperature (° C.) | Total Precipitation Time (hr) | Liquor oxalate (g/l) |
|---|---|---|---|---|
| 119 | Undosed control | 75 | 14 | 1.9 |
| 20 | 138 to LTP | 75 | 14 | 1.9 |
| 21 | 138 + blend A to LTP | 75 | 14 | 1.9 |
| 22 | 138 + blend B to LTP | 75 | 14 | 1.9 |
| 23 | Undosed control | 60 | 63 | 1.6 |
| 24 | 138 to LTP | 60 | 63 | 2.2 |
| 25 | 138 + blend A to LTP | 60 | 63 | 1.6 |
| 26 | 138 to LTP; blend A to I/S | 60 | 63 | 1.7 |
| 27 | 138 to LTP, blend B to I/S | 60 | 63 | 1.6 |
| 28 | 138 + blend B to LTP | 60 | 63 | 1.7 |

*LTP is liquor to precipitator (i.e., green liquor); I/S is interstage cooler

The data in Table 3 show that there was no precipitation of oxalate in any of the slurries maintained at 75° C. (Test Nos. 19–22). After continuing the precipitation at 60° C. for an extended period, the slurry dosed only with Nalco® 138 (Test No. 24) still did not show any indication of oxalate co-precipitation. By contrast, the undosed control, and slurries co-dosed with Nalco® 138 and either surfactant blend A or surfactant blend B, all showed loss of liquor oxalate and hence oxalate co-precipitation. This is regardless of when the surfactant blends (A or B) were added to the process.

The increase of liquor oxalate concentration from 1.9 to 2.2 g/l (Test Nos. 19–22, cf Test No. 24) is a consequence of a volume contraction caused by the precipitation of alumina trihydrate. Recovered trihydrate yields (after filtration and drying) varied between 56.61–56.80 gm (Test Nos. 19–22) and 61.76–62.98 gm (Test Nos. 23–28).

The data in Table 3 further show that control of liquor oxalate stability can be affected by the dosing of either surfactant blend A or surfactant blend B to either green liquor or to the interstage coolers.

Example 4

Nalco® 138 quaternary amine liquor oxalate stabilizer (15 ppm) was added to 210 gm of refinery A green liquor (oxalate content 3.1 g/l) in 250 ml Nalgene bottles. Refinery A seed (90 gm) was charged to each bottle and the slurries were maintained at 84° C. for 6 hours. The temperature was then reduced to 72° C. for a further 12 hours and then to 60° C. for an additional 72 hours while being agitated by end over end rotation. Surfactant blend A (as defined in Example 3 above) was dosed into samples at various times as shown in Table 4. Liquor oxalates were subsequently determined at the times shown in Table 4.

TABLE 4

| Bottle No. | Dose 138 (ppm) | Dose Blend A (ppm) | Time of Blend A Addition | Oxalate T = 50 hrs | Oxalate T = 74 hrs | Oxalate T = 80 hrs |
|---|---|---|---|---|---|---|
| 29 | 0 | 0 | — | 2.07 | 1.98 | 2.24 |
| 30 | 0 | 0 | — | 1.99 | 2.05 | 2.25 |
| 31 | 25 | 0 | — | 2.88 | 2.93 | 2.86 |
| 32 | 25 | 0 | — | 2.99 | 3.01 | 2.96 |
| 33 | 25 | 100 | 0 | 2.56 | 2.64 | 2.60 |
| 34 | 25 | 100 | 0 | 2.61 | 2.69 | 2.61 |
| 35 | 25 | 100 | 60 | 2.84 | 2.71 | 2.65 |
| 36 | 25 | 100 | 60 | 2.97 | 2.70 | 2.62 |
| 37 | 25 | 100 | 75 | 2.87 | 2.99 | 2.77 |
| 38 | 25 | 100 | 75 | 3.01 | 3.09 | 2.75 |

The data in Table 4 show that the impact of the quaternary ammonium reagent in stabilizing oxalate in solution is reduced by the addition of surfactant blend A to slurries.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of controlling the precipitation of soluble sodium oxalate in Bayer process liquor comprising the steps of:
   (a) adding a surface active quaternary ammonium compound to a Bayer process liquor to stabilize the sodium oxalate in the Bayer process liquor;
   (b) precipitating at least a portion of alumina trihydrate crystals from the Bayer process liquor;
   (c) subsequently adding a mixture of a hydrophobic oil and at least one surfactant to the Bayer process liquor to deactivate the stabilizing effect of the quaternary ammonium compound so that the sodium oxalate can be precipitated from the Bayer process liquor with the alumina trihydrate crystals; and
   (d) precipitating sodium oxalate for removal from the Bayer process liquor.

2. The method of claim 1 wherein the surface active quaternary ammonium compound is a surface active cationic alkylammonium compound having at least five carbon atoms.

3. The method of claim 2 wherein the surface active cationic alkylammonium compound is selected from the group consisting of methylbis(2-hydroxyethyl) cocoalkylammonium chloride, methyl(15 mol ethoxylate) cocoalkylammonium chloride, methylbis(2-hydroxyethyl) oleylammonium chloride, trimethylcocoalkylammonium chloride, trimethyltallowalkylammonium chloride, trimethylcetylammonium chloride, trimethyloleylammonium chloride and tris(2-hydroxyethyl)ammonium chloride.

4. The method of claim 1 wherein the hydrophobic oil is selected from the group consisting of alcohol distillation residues, paraffinic oils, higher paraffinic alcohols, aromatic oils, naphthenic oils and blends thereof.

5. The method of claim 1 wherein the surfactant is selected from the group consisting of fatty acid based surfactants and surfactants having a hydrophilic-lipophilic balance of not more than about 12.

6. The method of claim 5 wherein the fatty acid based surfactants are selected from the group consisting of tall oil, oleic acid and esters of oleic acid.

7. The method of claim 6 wherein the oleic acid ester is polyethylene glycol dioleate.

8. The method of claim 5 wherein the surfactants having a hydrophilic-lipophilic balance of not more than about 12 are selected from the group consisting of ethylene oxide, propylene oxide and mixtures thereof with a compound selected from the group consisting of alcohols and amines.

9. The method of claim 1 wherein the mixture of the hydrophobic oil and at least one surfactant comprises up to about 99 percent by weight of the hydrophobic oil.

10. The method of claim 1 wherein the quaternary ammonium compound is added to the Bayer process liquor in an amount of from about 1 to about 100 ppm.

11. The method of claim 1 wherein the quaternary ammonium compound is added to the Bayer process liquor in an amount of from about 1 to about 25 ppm.

12. The method of claim 1 wherein the mixture of the hydrophobic oil and at least one surfactant is added to the Bayer process liquor in an amount of from about 1 to about 100 ppm.

13. The method of claim 1 wherein the mixture of the hydrophobic oil and at least one surfactant is added to the Bayer process liquor in an amount of from about 2 to about 25 ppm.

* * * * *